3,003,450
ELEVATIONAL CONTROL SYSTEM FOR NAVIGABLE CRAFT

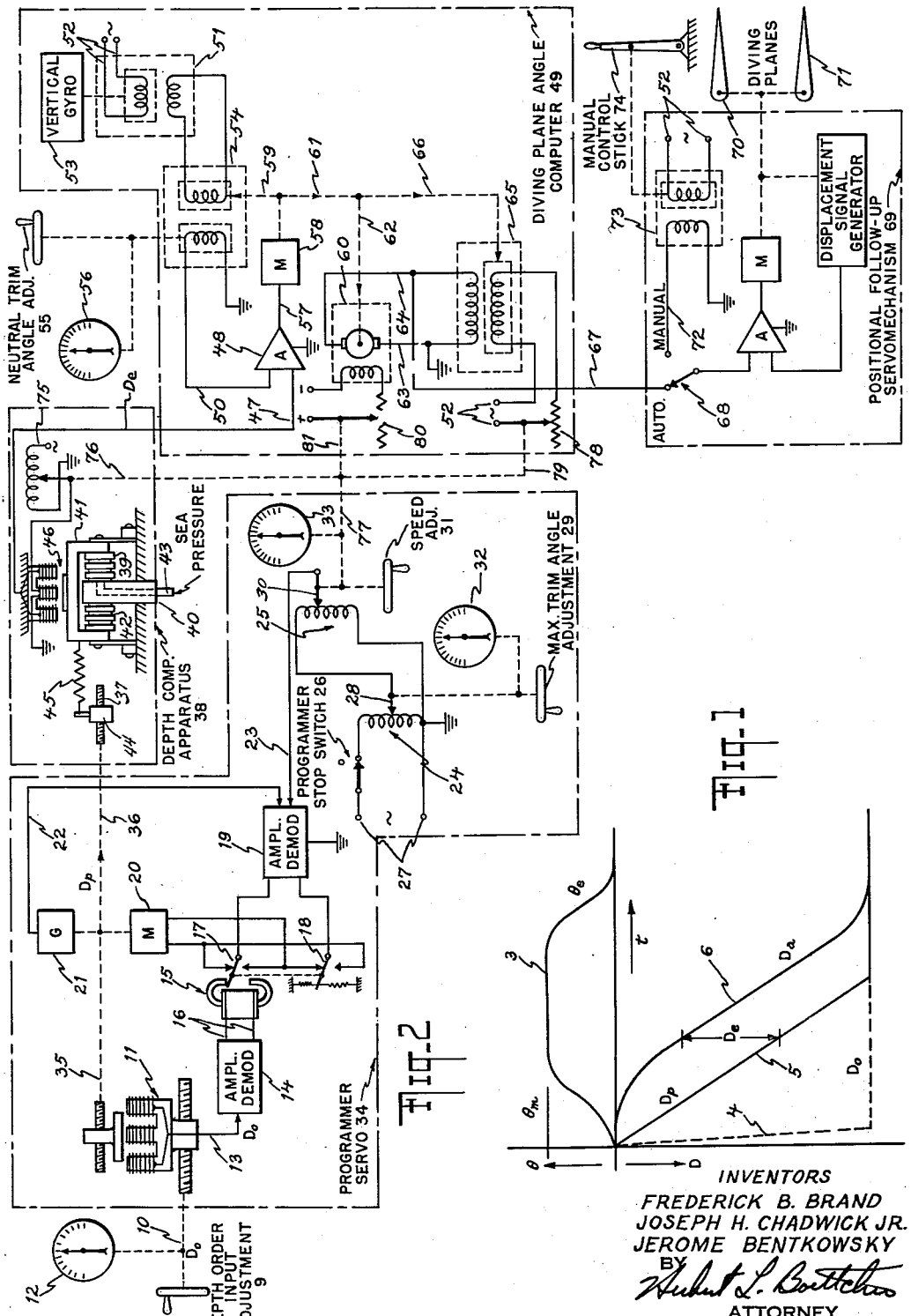
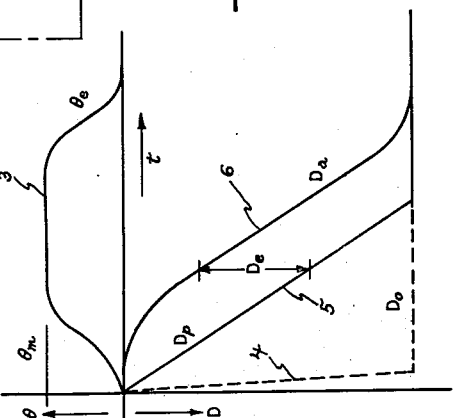

Frederick B. Brand, Sea Cliff, Joseph H. Chadwick, Jr., Amityville, and Jerome Bentkowsky, East Meadow, N.Y., assignors to Sperry Rand Corporation, a corporation of Delaware
Filed Oct. 15, 1956, Ser. No. 616,069
14 Claims. (Cl. 114—25)

This invention relates to elevational control systems for navigable craft. More particularly, the invention concerns an improved system for controlling a craft to seek and/or maintain a given elevational level such as an ordered depth for submarines and an ordered altitude for aircraft.

Some measure of operational safety has been obtained heretofore in elevational control systems by imposing a limit on the angular departure a craft can make about its athwartship axis from its trim position in response to an ordered elevational change. A representative form of prior art arrangement of this nature compares the ordered elevational level with the craft's present elevational level. A signal proportional to the difference or error is fed to a limiter device whose limiting value is set according to a selected maximum angular departure from trim of the craft about its athwartship axis. The craft's appropriate control surfaces are then deflected in an amount and direction to produce and maintain an angular departure from trim proportional to the elevational level error up to the error's limit. Hence, as long as the elevational level error exceeds or equals the limiting value, the craft has the selected maximum angular departure from trim. The response of the craft for a given speed, however, may not always be the same for this fixed angular departure.

A submarine, for example, is subject to response variations due to changes in its buoyancy brought about by its traversal through water that is not homogeneous, and to response variations due to wave motion. Similarly, the condition of the air through which an aircraft travels governs the response of the aircraft. Thus, the constant limited elevational level error presented to the representative control system thus far described makes it impossible at times for the system to exert corrective measures against response variations. Effectively, the control has a blind region where it cannot sense the response of the craft.

The present system employs what may be termed a "programmed ramp function" input arrangement instead of the "limited step-function" input arrangement just described. That is to say, ordered elevational level is not directly compared with present elevational level, but instead actuates a programmer servo which generates a ramp-shaped (linear with time) signal that ultimately attains a magnitude proportional to ordered elevational level. The ramp-shaped signal is compared with a signal representing present elevational level and the difference therebetween at any instant represents an instantaneous elevational level error. The craft's appropriate control surfaces are then deflected in an amount and direction to produce and maintain an angular departure from trim proportional to this instantaneous elevational level error. Blind regions of control are eliminated, since changes in the response of the craft will be reflected in the instantaneous elevational level error even when the elevational level of the craft is yet far removed from the ordered elevational level. Thus, the control system is continuously presented with a control quantity that enables the system to monitor and stabilize craft response throughout the entire elevational level change maneuver. The maximum angular departure from trim of the craft about its athwartship axis is regulated by adjusting the slope or rate of change of the ramp-shaped signal output of the programmer servo, and this slope is also adjusted as a function of the craft's speed.

The principal object of the present invention is to provide an improved system for controlling a craft maneuverable in elevation to change its present elevational level while preventing the craft from exceeding a given angular departure about its athwartship axis from a reference position.

Another object is the provision of an elevational level control system having a novel arrangement for programming an elevational level order signal in response to a step-like input so that the programmed signal's magnitude varies linearly with respect to time at a rate independent of the magnitude of the step-like input, and ceases to vary when the programmed signal reaches a given magnitude corresponding to the step-like input.

Another object is to provide an improved elevational control system by which the angular departures of a craft about its athwartship axis from a reference position may be limited to a selected range during the course of a system-controlled elevational level change without interfering with the system's ability to compensate for changes in craft response due to the condition of the surrounding medium.

With the foregoing and other objects in view, the present invention includes the novel combinations and elements described below and illustrated in the accompanying figures, wherein FIG. 1 is a family of curves illustrating the character of certain signals generated in the present invention as embodied in a depth control system for a submarine, and the response of the submarine to these signals; and, FIG. 2 is a schematic diagram of a submarine depth control system embodying the present invention.

Two rectilinear coordinate graphs having a common axis of abscissas in terms of time ($t$) are depicted in FIG. 1. The axis of ordinates of one graph, having the curve 3, is in terms of trim angle $\theta$, while the axis of ordinates of the other graph, having the curves 4, 5, 6, is in terms of depth D. Curve 4 illustrates the step-like character contemplated for the system's depth order input $D_o$. Curve 5 illustrates the ramp-shaped character of the programmed signal $D_p$ initiated by the step input $D_o$ and which the system "sees" as a depth order in lieu of $D_o$. Curve 6 is the depth response or plot of the actual depth $D_a$ of the submarine, and curve 3 is the trim angle response or plot of the angle-from-trim $\theta_e$. In the system, as will become more apparent hereinafter in connection with FIG. 2, $D_p$ is compared with $D_a$. The difference $D_e$ determines the angle-from-trim $\theta_e$. As more $\theta_e$ is obtained, $D_a$ changes until it changes at the same rate as $D_p$, at which time $D_e$ and $\theta_e$ remain constant. $D_p$ changes an amount dependent upon the magnitude of $D_o$. When $D_p$ ceases to change, $D_a$ catches up with $D_p$, and $D_e$ and $\theta_e$ diminish to zero.

Referring now to the system schematic of FIG. 2, it will be seen how the foregoing quantities and responses are generated according to the present invention. The step-like depth order $D_o$ is introduced into the system manually by an adjustment knob 9 to actuate a programmer servo 34. In this regard, a shaft 10 connects the knob to the stator of an E-pickoff 11 in programmer 34 so as to displace the stator from its null position with respect to the pickoff's armature according to the $D_o$ adjustment of knob 9. A suitably calibrated indicator 12 is linked to shaft 10 to indicate the adjustment or depth order selected.

The reversible phase, variable magnitude, alternating current signal output of pickoff 11 is fed via a lead 13 to the input of an amplifier-demodulator 14 whose output is an amplified D.C. version of the pickoff signal, having a polarity dependent on the phase of the pickoff signal. A polarized relay 15 is connected to the output of amplifier-demodulator 14 via a pair of leads 16. In response to an amplified signal of one polarity, relay 15 actuates the movable arms of a pair of single-pole double-throw switches 17, 18 against a centering spring bias to connect the output of an amplifier-demodulator 19 to a D.C. motor 20 so as to drive the motor in a given direction. And in response to an amplified signal of opposite polarity, relay 15 actuates switches 17, 18 to reverse the connections from amplifier-demodulator 19 to motor 20, whereby to reverse the rotation of the motor. In the absence of a signal from amplifier-demodulator 19 to relay 15, the centering spring bias of switches 17, 18 maintains their movable arms in an out-of-contact position, whereby motor 20 receives no energization.

Amplifier-demodulator 19 receives two signal inputs. One of these inputs is a rate feedback signal which insures that motor 20 is driven at a rate proportional to the other input. The rate feedback signal is produced, for example, by a tachometer-type rate generator 21 driven by motor 20, and is fed to amplifier-demodulator 19 via a lead 22. The other signal input to amplifier-demodulator 19 is obtained on a lead 23 by way of a cascaded pair of adjustable auto-transformers 24, 25 and a normally-closed switch 26 from an A.C. source having terminals 27. Switch 26 is provided for stopping the programmer servo if desired, as will be brought out later in a description of the system's operation.

Auto-transformer 24 includes a wiper arm 28. A manual adjustment knob 29 is mechanically connected to wiper arm 28 for positioning the arm according to the desired maximum trim angle $\theta_m$ (FIG. 1) for the submarine. Similarly, auto-transformer 25 includes a wiper arm 30. A manual adjustment knob 31 is mechanically connected to wiper arm 30 for adjusting the position of the arm a selected amount according to the speed of the submarine. By this arrangement, and with switch 26 closed, the signal input on lead 23 to amplifier-demodulator 19 is made to be proportional both to the desired maximum trim angle and the speed of the submarine. Suitably calibrated indicators 32, 33 are linked respectively to knobs 29, 31 to facilitate the accurate selection of knob adjustments.

The shaft rotation of motor 20 is the programmer servo output $D_p$ that is depicted graphically in FIG. 1. The total angular travel of this shaft rotation, hence the total extent of change in $D_p$, is made to be proportional to the adjustment given to depth order knob 9. In this regard, the shaft of motor 20 is connected via a linkage 35 to the armature of E-pickoff 11 so as to drive the armature in a follow-up manner back into a null relationship with the knob-displaced stator of the pickoff. The angular rate or speed of the shaft rotation output of motor 20, hence the slope of $D_p$ in FIG. 1, is proportional both to the desired maximum trim angle and the speed of the submarine, due to the like proportionality of the signal input on the amplifier-demodulator lead 23 to these quantities.

The mechanical signal output of the programmer servo 34 is fed via a linkage 36 from the shaft of motor 20 to a lead screw 37 which forms part of an apparatus 38 for comparing the programmer output $D_p$ with the actual depth $D_a$ of the submarine. Apparatus 38 comprises a Sylphon bellows 39 having a fixed end wall mounted on a side of a stanchion 40, and a movable end wall attached to one of the parallel legs of a generally C-shaped yoke 41. Yoke 41 passes over bellows 39, stanchion 40, and another Sylphon bellows 42. Bellows 42 has a movable end wall attached to the other of the parallel legs of the yoke and a fixed end wall mounted on an opposite side of stanchion 40 so as to face the fixed end wall of bellows 39. Leaf spring pivotal supports are preferably provided for yoke 41 at the parallel legs thereof.

Sea water from a point proximate the outside of the submarine's hull is introduced into bellows 39 via a conduit 43. Bellows 42, on the other hand, is sealed under a vacuum, and is provided for counteracting any tendency of bellows 39 to respond to changes in the atmospheric or internal hull pressure of the submarine. Thus, the response of bellows 39 is restricted to changes in sea water pressure, therefore to changes of depth of the submarine.

A traveling nut 44 is arranged on lead screw 37 to be driven axially thereof according to the rotation of the screw. And an isoelastic spring 45 is connected under tension between nut 44 and the C-shaped yoke 41 so that a resilient force dependent on the prdogrammer output $D_p$ is imparted to the movable end wall of bellows 39 in opposition to the sea pressure derived force thereon. Apparatus 38 is so arranged in relation to programmer servo 34 that when the programmed depth order $D_p$ corresponds in magnitude to the actual depth $D_a$, a force balance is obtained which maintains the deflection of bellows 39 at zero. In this manner, elastic strain on the bellows assembly is minimized. Any difference between the programmed depth order $D_p$ and the actual depth $D_a$, therefore, results in a deflection of bellows 39 and a departure of yoke 41 from its reference position. The magnitude and sense of this departure is detected by an E-pickoff 46 having its armature mounted atop the yoke and its stator fixed with respect to stanchion 40.

The reversible phase, variable magnitude, alternating current output signal from the stator of E-pickoff 46 is proportional to the difference or error $D_e$ between the programmed depth order $D_p$ and the actual depth $D_a$, and is fed via a lead 47 to an amplifier 48 forming part of a diving plane angle computer 49. Amplifier 48 also receives on a lead 50 a signal proportional to the trim angle error $\theta_e$ or the difference between the actual trim angle of the submarine and the submarine's neutral trim angle.

To obtain the $\theta_e$ signal, a signal proportional to the submarine's actual trim angle is first obtained in the stator winding of a selsyn-like device 51 having a rotor winding energized from a pair 52 of A.C. terminals and mechanically positioned by a connection to the pitch axis gimbal of a vertical gyroscope 53. The stator of device 51 is connected back-to-back with the stator of a selsyn-like device 54. Devices 51, 54 are alike except that the stator of device 54 is mounted for rotation independently of the rotation of its rotor. Lead 50 connects the rotor of device 54 to amplifier 48, and the $\theta_e$ signal in this lead results from an adjustment made to the rotor position of device 54 by a knob 55 which is manually actuated with the aid of a suitably calibrated indicator 56 to a setting according to the neutral trim angle of the submarine.

The output of amplifier 48 is connected via a lead 57 to a motor 58 whose shaft positions the rotatably mounted stator of the selsyn-like device 54 through a mechanical linkage 59. By this arrangement, the shaft of motor 58 is driven in response to the inputs to amplifier 48 on leads 47, 50 through an angular distance proportional to the algebraic sum of the depth error $D_e$ and the trim angle error $\theta_e$.

In the present system, a diving plane angle is computed that is proportional to the algebraic sum of the depth error $D_e$ and the trim angle error $\theta_e$ plus the algebraic sum of the rates of changes of these errors. Accordingly, computer 49 also includes a tachometer type rate generator 60 which is driven from motor 58 by way of a set of linkages 61, 62 so that the output of generator 60 is proportional to the rate of change of the shaft position of motor 58, hence is proportional to the algebraic sum of the rates of change of the depth and trim angle errors. This output of generator 60 is fed via a pair of leads 63, 64 to the stator of a selsyn-like device 65 whose rotor is driven from motor 58 by way of a mechanical connection 66 to linkages 61, 62 and is energized from the same terminals 52 as the rotor of device 51. By this arrangement, the mechanical signal on connection 66 proportional to the algebraic sum of the depth and trim angle errors is transduced and combined in leads 63, 64 with the electrical signal output from rate generator 60 proportional to the algebraic sum of the error rates.

The output thus obtained from computer 49 proportional to the computed plane angle is fed from lead 64 via a lead 67 to a two-position switch 68, one of whose positions (Auto) connects lead 67 to the input of a displacement follow-up servomechanism 69 for positioning the submarine's diving (bow and stern) planes 70, 71. The other position (Manual) of switch 68 disconnects lead 67 from the plane positioning servomechanism 69 and substitutes a lead 72 therefor which feeds a signal to the servomechanism from a displacement signal generator 73 like generator 65 but actuated by a manual control stick 74. By this arrangement, the deflection angle of diving planes 70, 71 is set manually by control stick 74, or, in the alternative, by the signal output of the system's plane angle computer 49, the mode of control being selected through switch 68.

Provision is preferably made in the present system for adjusting the sensitivity or signal level of the depth error signal $D_e$, as well as the sensitivity of the signal proportional to the algebraic sum of depth error and trim angle error and the sensitivity of the signal proportional to the rates of change of these errors. In each instance, the signal sensitivity is adjusted as a function of the submarine's speed. To this end, the depth error signal level is selected through an adjustable auto-transformer 75 connected in circuit with the A.C. supply to E-pickoff 46 and adjusted by way of a linkage 76, 77 connected to the speed adjustment knob 31. The algebraic sum signal level is selected through an adjustable resistance 78 connected in series with the A.C. supply to the rotor of selsyn-like device 65 and adjusted by a mechanical connection 79 to the speed-adjusted linkages 76, 77. And, by choosing a variable field or wound field generator to be the rate generator 60, the rate signal levels are selected through an adjustable resistance 80 connected in series with a D.C. supply to the wound field of generator 60 and adjusted by a mechanical connection 81 from the wiper arm of resistance 80 to the speed-adjusted linkages 76, 77.

To illustrate the operation of the present system, assume, for example, that the submarine is being manually controlled by stick 74 to keep a depth of 300 feet, and the automatic control system is energized or in standby condition. During manual control, the programmer stop switch 26 is kept closed and knobs 29, 31, 55 are properly adjusted for maximum trim angle, own ship's speed, and neutral trim angle, respectively. And at least for several minutes before switching to automatic control, the depth order knob 9 is kept at a setting of present depth, i.e. 300 feet, so that E-pickoff 46 is in a null output condition when the switch-over is made. Next, assume that it is desired to rise under automatic control to periscope depth. The operator then throws switch 68 from Manual to Auto, and follows this operation by setting the depth order knob 9 to periscope depth.

Programmer servo 34 then smoothly generates the mechanical signal $D_p$ whose magnitude vs. time relation is ramp-shaped as shown in FIG. 1. The $D_p$ output of programmer servo 34 is compared with actual depth $D_a$ by the depth comparison apparatus 38, and a signal representing the depth error $D_e$ is fed to amplifier 48 of computer 49. There being no angular departure $\theta_e$ from neutral trim at first, the depth error and depth error rate are initially in sole control of the diving planes. But as the diving planes deflect, an angular departure from neutral trim results. This departure, $\theta_e$, increases until it matches the depth error $D_e$ signalwise, the match being obtained substantially without an overshoot in $\theta_e$. The diving planes are controlled according to the movements of motor 58 to assume whatever angle is required of them to maintain the match between $\theta_e$ and $D_e$. In the absence of changing water conditions as earlier noted, the depth error $D_e$ remains at a steady-state value until the programmed depth order $D_p$ reaches the magnitude of the depth order input $D_o$. Thereupon, the boat, under the influence of its inertia, closes the gap between its actual depth and the now-stopped depth order $D_p$, resulting in a diminishing depth error $D_e$. Hence, the trim angle error $\theta_e$ becomes relatively larger and causes motor 58 to drive in a direction calling for a diving plane deflection that reduces the trim angle error. Thus controlled, the boat asymptotically levels off at the ordered periscope depth and at its neutral trim angle; and the boat is kept at this depth and neutral trim angle by the control system as long as desired.

While the submarine is progressing through an automatically controlled change of depth, say a dive from 100 feet to 400 feet, it may be decided to reverse the maneuver and rise under automatic control to periscope depth. In this event, the operator opens the programmer stop switch 26, whereby motor 20 is deenergized and the programmed input $D_p$ to depth comparison apparatus 38 is thereby held at the value it has then attained. The operator next adjusts the depth order input knob 9 to call for periscope depth. And, when the boat levels off at the intermediate depth called for by the then attained value of the programmed input $D_p$, the operator recloses the programmer stop switch 26. This operation reenergizes motor 20 in the reverse direction, whereupon the programmed input $D_p$ to depth comparison apparatus 38 is caused to change in the reverse sense until it reaches a value representing the periscope depth ordered by way of knob 9.

While the invention is described in its preferred embodiment, it is to be understood that the words used are words of description rather than of limitation, and that changes within the purview of the appended claims may be made without departing from the true scope and spirit of the invention in its broader aspects.

What is claimed is:

1. An elevational control system for navigable craft with elevators including servo means operatively connected to the elevators for changing the elevation of the craft, means for programming a change in elevation of the craft including a motor having an output, means settable in accordance with a desired change in the elevation of the craft for determining the output travel of the motor of said program means, means for determining the speed of operation of the motor of said program means through its travel range including means settable in accordance with the speed of the craft and means settable in accordance with a maximum trim angle adjustment of the elevators, means for computing the elevation of the craft providing an output, means providing an output in accordance with the difference between the outputs of the motor of said program means and said elevation computing means, means for computing the elevation angle of the craft with respect to a horizontal reference plane containing its pitch axis providing an output, and means for operating said servo means in accordance with the difference between the outputs of said elevation angle computing means and said difference means.

2. A system of the character claimed in claim 1, including means for adjusting the output of the difference means between the program means and elevation computing means in accordance with the speed of the craft.

3. A system of the character claimed in claim 1, including means for providing a second output for operating said servo means in accordance with the rate of change of the output of said servo operating means, and means for adjusting said rate of change output means in accordance with the speed of the craft.

4. A system of the character claimed in claim 1, including means for adjusting the output of the difference means between the program means and elevation computing means in accordance with the speed of the craft, means for providing a second output for operating said servo means in accordance with the rate of change of the output of said servo operating means, and means for adjusting said rate of change output means in accordance with the speed of the craft.

5. A depth control system for submarines with diving planes including servo means operatively connected to the diving planes for changing the depth of the submarine, means for programming a change in depth of the submarine having a rotational output, means settable in accordance with a desired change in the depth of the submarine for determining the extent of the travel of the program output means, means for determining the velocity of the rotational output of said program output means during operation including means settable in accordance with the speed of the submarine and means settable in accordance with a maximum trim angle adjustment of the diving planes, means for computing the depth of the submarine providing an output, means providing an output in accordance with the difference between the outputs of said program output means and said depth computing means, means for computing the diving plane angle of the submarine with respect to a horizontal reference plane containing the pitch axis of the submarine providing an output, and means for operating said servo means in accordance with the difference between the outputs of said diving plane angle computing means and said difference means.

6. A system of the character claimed in claim 5, including means for adjusting the output of the difference means between the program means and depth computing means in accordance with the speed of the submarine.

7. A system of the character claimed in claim 5, including means for providing a second output for operating said servo means in accordance with the rate of change of the output of said servo operating means, and means for adjusting said rate of change output means in accordance with the speed of the submarine.

8. A system of the character claimed in claim 5, including means for adjusting the output of the difference means between the program means and depth computing means in accordance with the speed of the submarine, means for providing a second output for operating said servo means in accordance with the rate of change of the output of said servo operating means, and means for adjusting said rate of change output means in accordance with the speed of the submarine.

9. In an elevational control system for navigable craft with elevators; means for programming a change in elevation of the craft including a motor having an output, means settable in accordance with a desired change in the elevation of the craft for determining the output travel of the motor of said program means, means for determining the speed of operation of the motor of said program means through its travel range including means settable in accordance with the speed of the craft and means settable in accordance with a maximum trim angle adjustment of the elevators, means for computing the elevation of the craft providing an output, and servo means operable to control the elevation of the craft in accordance with the difference between the outputs of the motor of said program means and said elevation computing means.

10. A system of the character claimed in claim 9, including means for adjusting the servo operating difference means in accordance with the speed of the craft.

11. In a depth control system for submarines with diving planes; means for programming a change in depth of the submarine having a rotational output, means settable in accordance with a desired change in depth of the submarine for determining the extent of the travel of the program output means, means for determining the velocity of the rotational output of said program output means during operation including means settable in accordance with the speed of the submarine and means settable in accordance with a maximum trim angle adjustment of the diving planes, means for computing the depth of the submarine providing an output, and servo means operable to control the depth of the submarine in accordance with the difference between the outputs of said program output means and said depth computing means.

12. A system of the character claimed in claim 11, including means for adjusting the servo operating difference means in accordance with the speed of the submarine.

13. In an elevational control system for navigable craft with elevators; servo means operable to control the elevation of the craft, means for programming a change in elevation of the craft including a motor having an output operatively connected to the servo means, means settable in accordance with a desired change in the elevation of the craft for determining the output travel of the motor of said program means, and means for determining the speed of operation of the motor of said program means through its travel range in accordance with the speed of the craft and in accordance with a maximum trim angle adjustment of the elevators.

14. In a depth control system for submarines with diving planes; servo means operable to control the depth of the submarine, means for programming a change in the depth of the submarine having a rotational output operatively connected to the servo means, means settable in accordance with a desired change in the depth of the submarine for determining the extent of the travel of the program output means, and means for determining the velocity of the rotational output of said program output means during operation in accordance with the speed of the submarine and in accordance with a maximum trim angle adjustment of the diving planes.

References Cited in the file of this patent
UNITED STATES PATENTS 2,627,384    Esval _____ Feb. 3, 1953
2,733,382    Rand _____ Dec. 11, 1956